United States Patent [19]

Hayes, Sr. et al.

[11] 4,175,315

[45] Nov. 27, 1979

[54] ALL PLASTIC HINGE HAVING A NON-RISING PIN AND METHOD OF MAKING THE SAME

[76] Inventors: Frank F. Hayes, Sr.; Frank F. Hayes, Jr; John C. Hayes, all of 3120 El Dorado, Las Vegas, Nev. 89120

[21] Appl. No.: 795,218

[22] Filed: May 9, 1977

[51] Int. Cl.² .................. B23P 11/02; B29C 25/00; B29D 31/00
[52] U.S. Cl. .................................. 29/453; 16/169; 29/11; 29/525; 264/237; 264/327
[58] Field of Search .............. 16/169; 264/242, 237, 264/327, 342; 29/453, 525

[56] References Cited

U.S. PATENT DOCUMENTS

| | | | |
|---|---|---|---|
| 3,000,049 | 9/1961 | Terry | 264/328 X |
| 3,069,105 | 12/1962 | Press | 264/242 X |
| 3,110,057 | 11/1963 | Urich | 16/169 X |

*Primary Examiner*—Thomas P. Pavelko
*Attorney, Agent, or Firm*—G. Turner Moller

[57] ABSTRACT

There is disclosed an all plastic hinge for hanging conventionally sized doors for buildings and the like. Means are provided to prevent the pin from rising out of the passage afforded by the hinge halves by establishing a preferred direction of pin movement in the pin inserting direction. An enlargement in the pin receiving passage is created by differentially shrinking the knuckle surrounding the passage during the process of manufacture.

4 Claims, 7 Drawing Figures

ALL PLASTIC HINGE HAVING A NON-RISING PIN AND METHOD OF MAKING THE SAME

This invention relates to a hinge for mounting conventional building, office, apartment or residential doors and particularly to such a hinge comprised of plastic hinge halves and a plastic pin.

Although commercially available door hinges are presently made of metal, the effort expended in the development of this invention suggests that substantial economics can be achieved by manufacturing door hinges from plastic. Indeed, the disparity in cost is so great that a high quality all plastic hinge can be manufactured less expensively than the cheapest low quality metal hinge.

It has been suggested in the prior art to manufacture a hinge pin of solid molded plastic as disclosed in U.S. Pat. No. 3,593,364.

One problem in the design of an all plastic hinge is that plastic materials typically do not corrode and consequently exhibit a substantially lower coefficient of friction throughout the useful life thereof. This tends toward allowing the hinge pin to rise out of the passage formed by the hinge knuckles which obviously can substantially weaken the hinge in use. In addition, a rising hinge pin is not acceptable to consumers because effort must periodically be expended to drive the hinge pin into its fully depressed position.

Although the provision of non-rising hinge pins is well known in the prior art, most of the designs are intricate, expensive and require a multiplicity of small machined parts which are prone to fail. Typical designs of non-rising hinge pins are illustrated in U.S. Pat. Nos. 85,902; 2,154,860; 2,734,223; 2,772,441; 2,978,736 and 3,593,364. These prior art non-rising hinges typically attempt to captivate the pins, i.e. prevent it from moving in either direction.

The most pertinent designs for non-rising hinges are found in U.S. Pat. Nos. 2,154,860 and 2,734,223 wherein the naturally occuring convex configuration of the passage through a metallic knuckle provides an abutment for a locking engagement on the pin. Such designs depend on the formation of the convex passage configuration during rolling of the metal hinge and are accordingly inapplicable to plastic molded hinges. In addition, the locking enlargement is a separate metal element that must be assembled with the hinge.

In an endurance test by Hales Testing Laboratories of Oakland, California, a standard hollow core interior door weighing 21.2 pounds was mounted with two all plastic hinges of this invention onto a standard jamb. An additional 42.4 pound weight was bolted to the center of the door. The door was fully opened and fully closed for 100,000 cycles at the rate of 15 cycles per minute. The diameter of the hinge pins was measured before the start of the test, at the completion of 30,000 cycles, and at the completion of 100,000 cycles. The hinges were not oiled or lubricated before or during the test. The all plastic hinges of this invention withstood the 100,000 cycle endurance test at triple the weight of a standard hollow core door without any visual signs of the plastic hinges yielding and without any visual signs of impending failure. There was no wear of the hinge pin as measured by micrometers before, during and after the test. There was no squeaking noise during the entire test. The hinge screws did not loosen nor did the hinge pin rise out of its passage. It will, of course, be appreciated that a 100,000 cycle test constitutes an enormously long expected life for a door hinge as measured in years of use.

The highest quality metal hinges presently commercially available are known as ball bearing type hinges in which the hinge pin is surrounded and journaled by a pair of ball bearing assemblies, each of which comprise an inner race receiving the hinge pin, a plurality of ball bearing elements and an outer race. Hinges of this type are characterized by long useful lives, easy opening and easy closing tendencies and the absence of noise, specifically squeaking, in use. Such hinges are quite costly. The all plastic hinge of this invention compares favorably with ball bearing hinges for ease of opening and closing and lack of squeaking in use. The cost of the hinge of this invention is in the range of 5–10% of the cost of a ball bearing hinge.

It is an object of this invention to provide an all plastic hinge providing a non-rising hinge pin.

In summary, the hinge of this invention comprises plastic hinge halves each of which includes a generally planar hinge leaf and one or more knuckles integral therewith and providing a passage for receiving a hinge retaining pin and defining an axis of pivotal movement of the hinge. The hinge pin and passage are designed to prevent the pin from rising out of the pin receiving passage in use. This is accomplished by configuring the pin and the passage to establish a naturally or normally preferred direction of pin movement in use. This preferred direction of pin movement is in the same direction as the pin is inserted into the passage and is opposite from the direction that the pin is removed from the passage.

Figure 1:
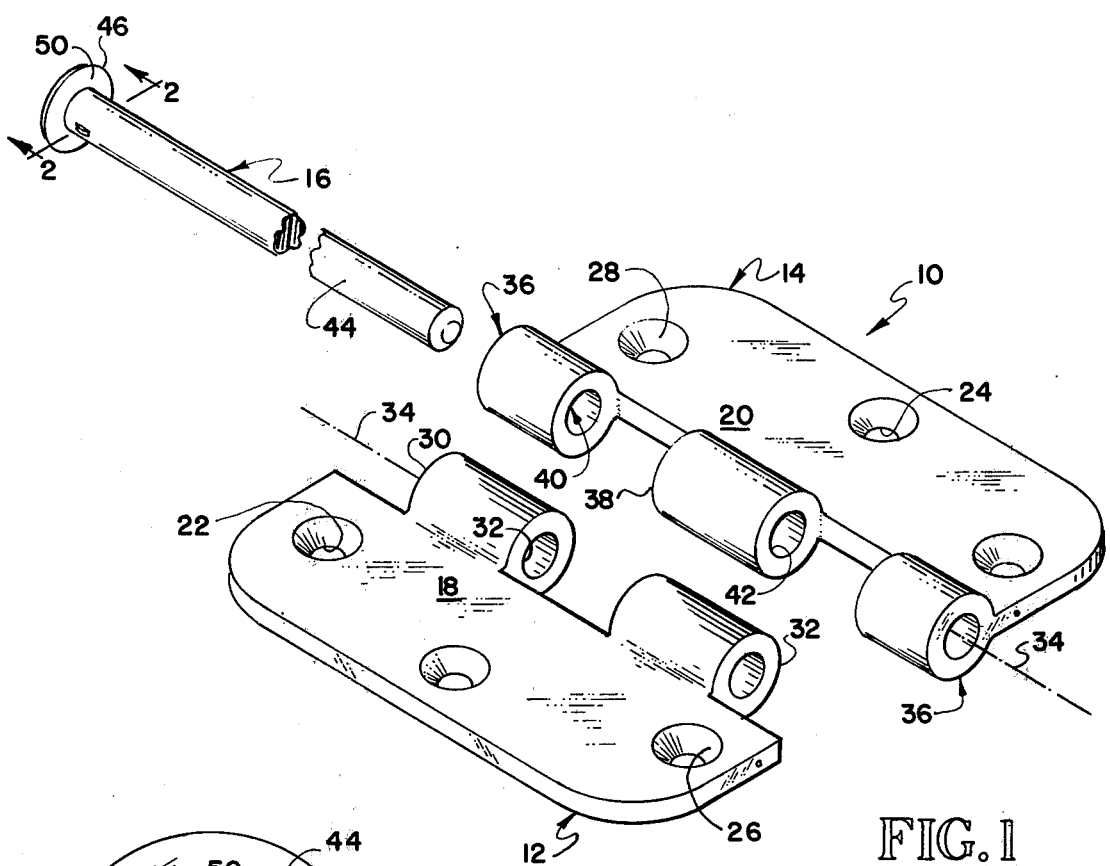
FIG. 1 is an exploded isometric view of the all plastic hinge of this invention.
Figure 2:
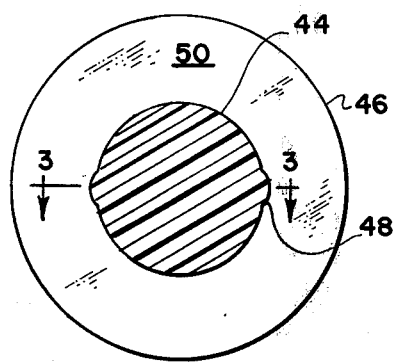
FIG. 2 is an enlarged cross-sectional view of the hinge pin of FIG. 1 taken substantially along line 2—2 thereof as viewed in the direction indicated by the arrows.
Figure 3:
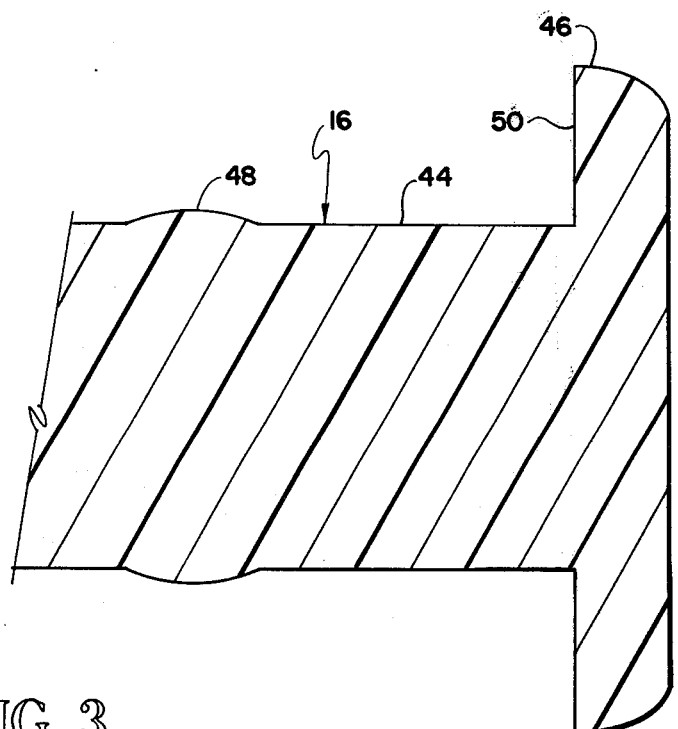
FIG. 3 is an enlarged cross-sectional view of the hinge pin of FIGS. 1 and 2 taken substantially along line 3—3 of FIG. 2 as viewed in the direction indicated by the arrows.

Referring to FIG. 1, there is illustrated a door hinge 10 of this invention comprising first and second molded hinge halves 12, 14 and a molded hinge pin 16. Any plastic piece can be visually inspected and determined to be molded because of the existance of mold marks or plastic entry openings.

The hinge halves 12, 14 each comprise a planar hinge leaf 18, 20 having a plurality of openings 22, 24 therein for receiving screws or other customary fasteners for attaching the hinge halves 12, 14 to a door or door jamb as is customary in the art. The openings 22, 24, each comprise a generally conical surface 26, 28 for receiving and countersinking the screw heads in order to position the exposed surface thereof generally flat with the upper surface of the hinge leaves 18, 20. It is accordingly apparent that the hinge leaves 18, 20 are substantially identical.

Integrally molded to the hinge leaf 18 are a plurality of interior hinge knuckles 30 providing a passage 32 therethrough defining a hinge axis 34. Integrally molded to the hinge leaf 20 are one or more end knuckles 36 and an interior knuckle 38 providing passages 40, 42 respectively which also act to define the hinge axis 34. It will be evident that the knuckles 32, 36, 38 are axially spaced apart and, when assembled, interdigitate to provide a substantially continuous passageway for receiving the hinge pin 16. Although the hinge half 12 is illustrated as comprising a pair of interior knuckles 30 and the hinge half 14 is illustrated as comprising three knuckles 36, 38, it will be apparent that the number and placement of the hinge knuckles is subject to modification.

The hinge pin 16 comprises a shank 44 of generally uniform circular cross-section having an enlarged head 46 on one end thereof. As will be explained more fully hereinafter, the shank 44 provides a plurality of locking ribs 48 spaced from the undersurface 50 of the head 46 and extending radially beyond the exterior of the shank 44. The diameter of the shank 44 is in the range of about 1/5-⅛ inches and, in a production model of the invention, is 0.240 inches.

Figures 4, 5:
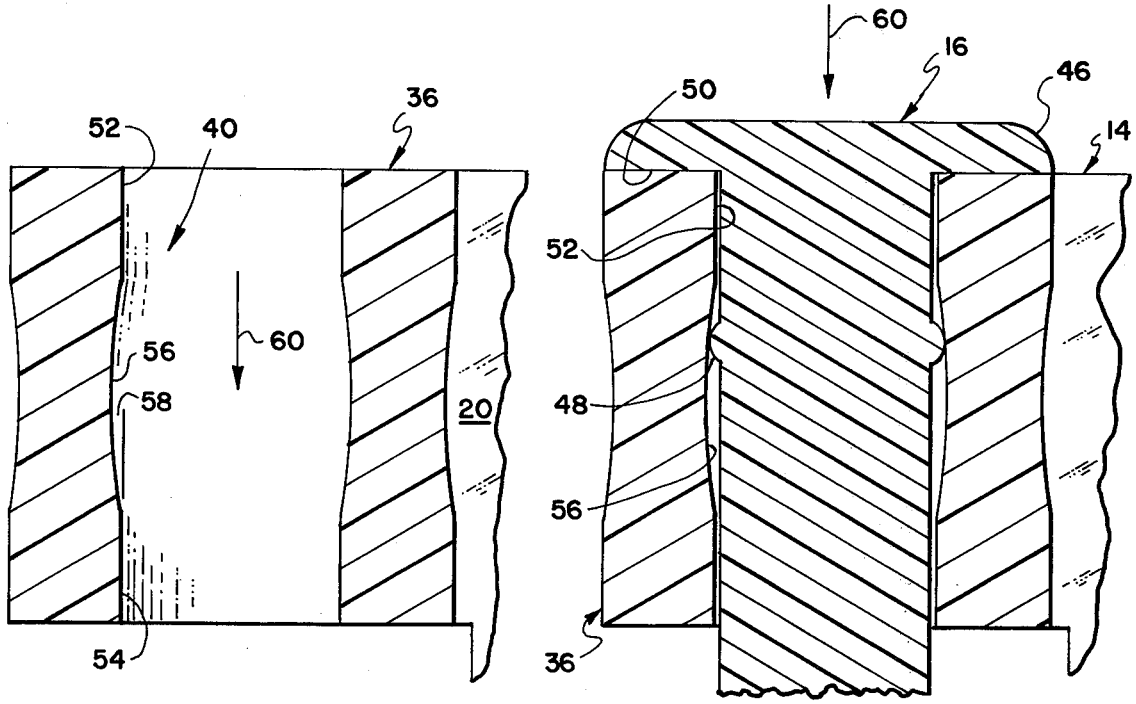
FIG. 4 is a much enlarged cross-sectional view of an end hinge knuckle taken in the direction parallel to the axis of the hinge pin.
FIG. 5 is a view similar to FIG. 4 illustrating the placement of the hinge pin in the end knuckle.

Referring to FIGS. 4 and 5, there is illustrated in greater detail the technique for maintaining the hinge pin 16 in place during extended operation. The passage 40 in the end knuckles 36 comprises end sections 52, 54 of generally uniform, equal circular cross-section and an intermediate section 56 of larger generally circular cross-section. The section 56 bells outwardly from the junction with the section 52 to a maximum value near the center of the knuckle 36 and then tapers inwardly to join the section 52. For purposes of illustration, the difference between the diameters of the sections 52, 54 and the section 56 is greatly exaggerated. The gap 58, indicative of the difference in diameter, is normally quite small, for example, less than about 0.005". Indeed, in the production model of the hinge 10, the gap 58 is on the order of 0.001–0.002". The passage section 52 is desirably at least on the order of about 10% of the axial dimension of the knuckle 36.

Referring to FIG. 5, the hinge pin 16 is illustrated as disposed in the knuckle 36 with the locking ribs 48 positioned in the passage section 46. The maximum dimension through the shank 44 and ribs 48 perpendicular to the axis 34 is greater than the diameter of the passage section 52 and preferably is greater than the maximum diameter of the section 56. Accordingly, when the pin 16 is moved, in a pin inserting direction indicated by the arrow 60, the locking ribs 48 are elastically deformed during movement through the passage section 52. As the ribs 48 emerge from the section 52 and pass into the section 56, the ribs 48 are stressed to a lesser extent. It will be apparent that the spacing between the undersurface 50 and the ribs 48 controls the maximum penetration of the ribs 48 into the passage section 56. In a production model of the invention, the diameter of the passage section 52 is on the order of 0.242–0.246" while the maximum diameter of the section 56 is on the order of 0.246–0.247". It will accordingly be seen that the passage 40 is of complex concave configuration in an axial direction.

The maximum transverse dimension of the shank 44 and ribs 48 exceeds the diameter of the passage section 52 and preferably exceeds the maximum diameter of the section 56. Accordingly, the transverse dimension of the pin 16 through the locking ribs 48 is, in the production version of this invention, at least 0.246 inches and preferably is at least about 0.250 inches. The maximum dimension through the pin 16 along the ribs 48 is dictated by the elastic limit of the material of the pin 16. Desirably, the ribs 48 are not stressed beyond the elastic limit of the material thereof during passage through the section 52. Because the locking ribs 48 are disposed in the passage section 56 between the maximum diameter thereof and the section 52, there is established a preferred direction of pin movement in the pin inserting direction. It will be seen that if the pin 16 tends to move at all, it tends to move in a direction relaxing the elastic deformation of the ribs 48 rather than in a direction further compressing the same. In the alternative, the flared configuration of the upper end of passage section 56 may establish a reaction vector on the pin 16 in the pin inserting direction. In any event, inserting the pin 16 into the passage 40 causes a snap-type fit as the ribs 48 pass into the section 56. Movement of the pin 16 in the pin inserting direction is, of course, limited and controlled by engagement of the pin head 46 with the top of the end knuckle 36.

The hinge 10 is manufactured by conventional injection molding techniques utilizing any organic polymeric resin suitable for injection molding. Nylon has proved to be eminently satisfactory as a material.

Figures 6, 7:
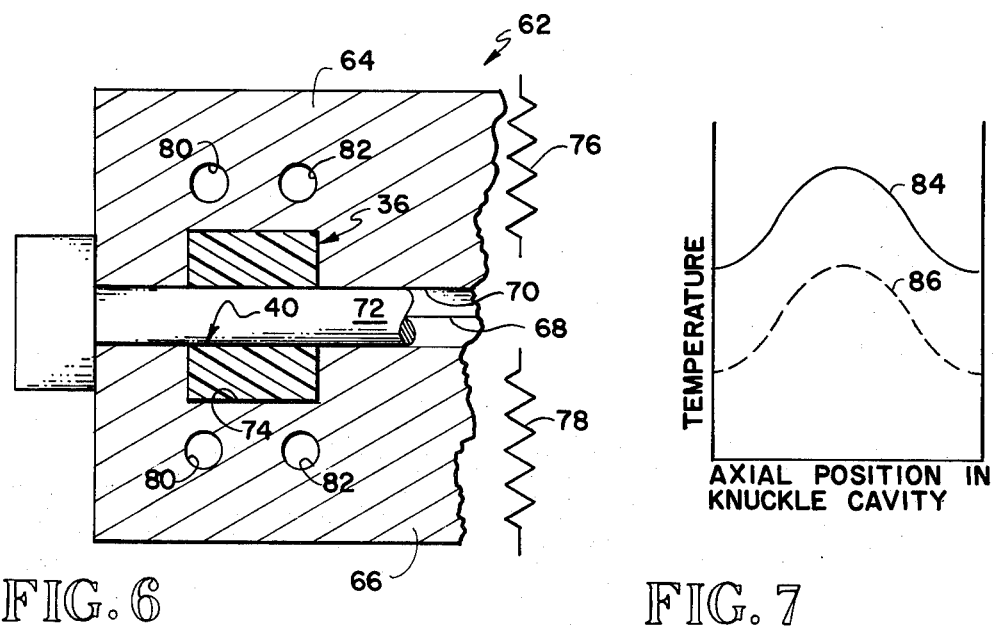
FIG. 6 is a cross-sectional view of part of a mold used to manufacture the hinge halves of this invention.
FIG. 7 is a temperature diagram in the knuckle cavity during molding.

The enlarged passage section 56 is desirably formed during cooling of the hinge halves during and after removal thereof from the mold. Referring to FIG. 6, there is illustrated a mold 62 comprising mold halves 64, 66 separable along a parting line 68. The mold halves 64, 66 define therebetween a cylindrical passage 70 for receiving a mold pin 72 of uniform diameter which establishes the internal passage 40 through the knuckle 36 which is formed in a cavity 74 defined by the mold halves 64, 66. The mold may be heated in any suitable fashion, as by the provision of electric resistance heating elements 76, 78. Extending through the mold halves 64, 66 are a plurality of water or coolant passages 80, 82. As will be pointed out more fully hereinafter, the passages 80, 82 are disposed adjacent the ends of the knuckle cavity 74 and act to establish a temperature differential in the plastic material in the cavity 74 during molding.

Referring to FIG. 7, there is illustrated a temperature profile across the knuckle 36 during cooling of the plastic material as a function of the axial position in the knuckle cavity 74. It will be apparent that the maximum temperature 84 occurs in the axial center of the cavity 74. Accordingly, the plastic material comprising the axial center of the knuckle 36 is hotter than the plastic material comprising the ends of the knuckle 36. Thus, when the plastic material begins to solidify because of a reduction in temperature caused by coolant movement through the passages 80, 82, the temperature profile appears as the dashed line 86 in FIG. 7. When the hinge halves 12, 14 are removed from the mold 62, the knuckle 36 exhibits a temperature gradient in the axial direction comparable to the temperature gradient 86 established in the mold 62. As the hinge half 14 cools to ambient temperature, the axial center of the knuckle 36 cools a greater temperature difference than does the axial ends thereof. Because the temperature coefficient of expansion and contraction of the plastic material is substantially constant as a function of axial position in the knuckle 36, the center of the knuckle 36 shrinks more than does the axial ends as is illustrated in an exaggerated fashion in FIGS. 4 and 5. As mentioned previously, the diameter of the passage section 52 is in the range of 0.242 –0.246 inches while the maximum diameter of the section 56 is on the order of 0.246–0.247 inches. The external diameter of the axial ends of the knuckles varies in the range of 0.485–0.489 inches while the diameter of the axial center of the knuckles varies in the range of 0.473–0.478 inches. It will accordingly be seen that controlling the position of the coolant passages 80, 82 is a convenient technique for providing an enlarged or belled passage section in the knuckles.

Although the invention has been described in its preferred form with a certain degree of particularity, it is understood that the present disclosure of the preferred form is only by way of example and that numerous changes in the details of construction and the combination or arrangement of parts may be resorted to without departing from the spirit and scope of the invention as hereinafter claimed.

I claim:

1. A method of making a door hinge half comprising hinge leaf having a plurality of knuckles thereon providing an axial pin receiving passage wherein one of the knuckles provides axially spaced first and second passages of lesser and greater dimension transverse to the axis respectively, comprising placing an organic polymeric material in a mold having a knuckle cavity traversed by a mold pin, of generally constant cross-sectional dimension, establishing the passage sections;

creating a temperature differential in the mold wherein the mold adjacent the second passage section is hotter than adjacent first passage section;

withdrawing the molded hinge half from the mold when the temperature of the knuckle adjacent the second passage section is greater than the temperature of the knuckle adjacent the first passage section;

cooling the knuckle to ambient temperature and allowing the knuckle adjacent the second passage section to shrink a greater amount than adjacent the first passage section.

2. The method of claim 1 wherein the placing step comprises injecting the organic polymeric material in a molten condition into the mold.

3. The method of claim 2 wherein the creating step comprises heating the mold generally uniformly and cooling the mold adjacent the first passage section to a greater extent than adjacent the second passage section.

4. The method of claim 1 wherein the first and second passage sections are sequentially positioned in a hinge pin inserting direction and further comprising inserting a hinge pin having an enlargement thereon through the first passage section and then through the second passage to position the enlargement in the second passage section.

* * * * *